United States Patent

[11] 3,563,508

| [72] | Inventor | Bruce L. DeLorenzo |
| | | 124 Fenner Ave., Clifton, N.J. 07013 |
| [21] | Appl. No. | 783,666 |
| [22] | Filed | Dec. 13, 1968 |
| [45] | Patented | Feb. 16, 1971 |
| | | Continuation-in-part of application Ser. No. 547,560, May 4, 1966, now abandoned. |

[54] VALVE INCLUDING PISTON WITH SPACED APART PLATES
9 Claims, 1 Drawing Fig.

[52] U.S. Cl. .................................................. 251/63.5; 251/324; 92/257
[51] Int. Cl. .................................................. F16k 31/12
[50] Field of Search .......................................... 251/31, 324, 63.5, 63.6, 63, 62, (O-ring); 92/250, 257; 137/329, 329.06

[56] References Cited

UNITED STATES PATENTS

| 1,338,765 | 5/1920 | Brandt .................... | 92/250X |
| 3,189,233 | 6/1965 | Wilson et al. ............ | 92/250X |
| 3,219,059 | 11/1965 | Williams et al. .......... | 137/625.37X |
| 3,331,583 | 7/1967 | Baker .................... | 251/63.5 |

FOREIGN PATENTS

| 1,322,813 | 2/1963 | France .................... | 251/O-ring |

Primary Examiner—Arnold Rosenthal
Attorneys—Arthur A. March, Kleon M. LeFever and Douglas W. Wyatt ABSTRACT: A valve arrangement has a piston integral with the plunger. The walls of the housing surrounding the plunger are provided with fluidtight seals. The walls of the housing adjacent the seals are cutback. The plunger may terminate in a disc formed from two spaced apart plates.

PATENTED FEB 16 1971 3,563,508
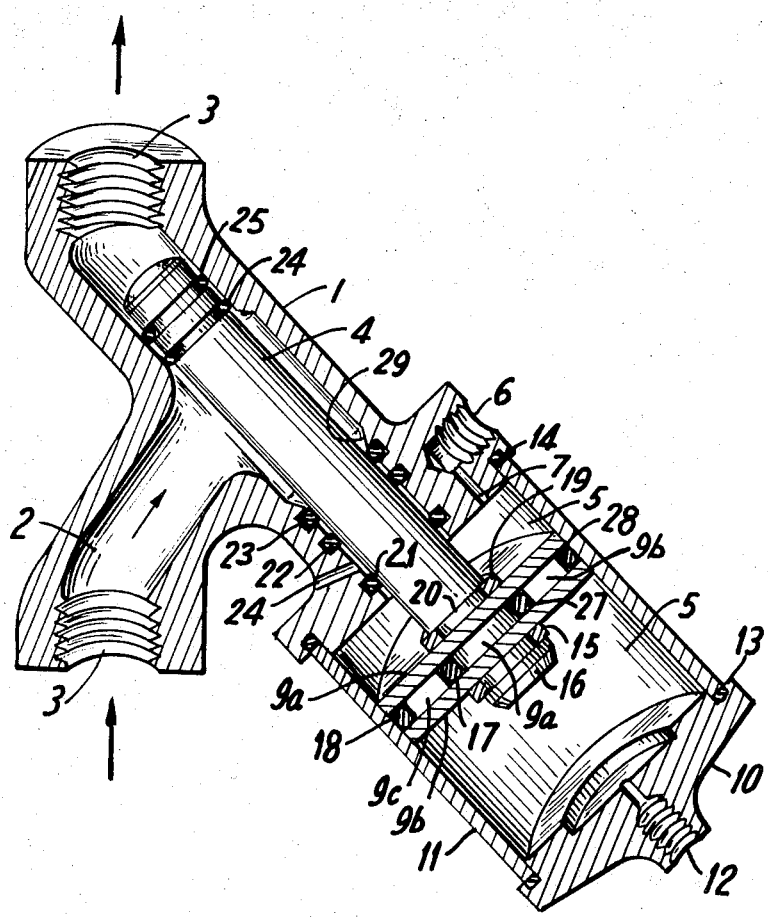
INVENTOR.
BRUCE L. DE LORENZO
BY
March, Le Fever & Wyatt
ATTORNEYS

VALVE INCLUDING PISTON WITH SPACED APART PLATES

The subject application is a continuation-in-part of copending application Ser. No. 547,560 filed May 4, 1966, and now abandoned.

This invention relates to a pneumatic valve employed for the purpose of controlling the flow of fluids.

The current state of the art of pneumatic valves does not show a design that combines the features of integral construction, dual purpose (flow control valve as well as relief valve), strategic location of bleed holes, integral plunger and piston construction which does not appreciably disturb the flow pattern, a sealing arrangement that provides a self-cleaning action of the plunger and valve seat, and a means to replace seals or clean the valve interior without removing the valve from the piping system.

It is an object of this invention to provide a pneumatic valve construction of integral design which tends to eliminate leakage of fluid through the valve body. Another object is to maintain the number of parts at a minimum, and eliminating externally moving linkages. A further object of the present invention is to reduce the possibilities of corrosion and dust penetration. Still another object is to provide a valve construction which prevents accumulation of foreign matter between the piston and the wall of the housing. Yet another object is to provide a valve of the type which allows easy assembly, cleaning, and repairing. A still further object is to provide a valve having improved disc construction.

It is another object of this invention to provide a bleed hole or holes in the valve assembly so that a steady flow of fluid from the valve chamber into the actuating chamber, due to seal failure, is prevented and vice versa. The bleed hole or holes also prevent the pressure of the fluid in the valve chamber from entering the actuating chamber due to seal failure and vice versa.

It is another object of this invention to provide the alternative of piping the valve in such a manner that when the valve is closed it will remain closed regardless of the magnitude of the inlet pressure provided there is not sufficient back pressure at the outlet port to open the valve, and in addition, when the valve is open there is no inherent tendency for it to close when there is positive pressure in the valve chamber. The other alternative of piping the valve would offer the possibility of not only being a flow control valve but also a relief valve.

An additional object of this invention is to provide a valve design in which the plunger moves completely out of the flow path of the valve fluid. In this manner the flow of the valve fluid is not restricted by the plunger when the valve is open. Restrictions change the flow characteristics of the valve fluid through losses in energy and pressure.

It is also an object of this invention to provide an arrangement of plunger seals which aside from serving their normal sealing functions, also furnish a wiping and cleaning action. Such wiping and cleaning action prevents the accumulation of foreign particles upon the sealing section of the plunger and on the valve seat.

A still further object of this invention is to provide an integral plunger and piston assembly. Such integral assembly of the piston and plunger avoids the problems associated with nonintegral assembly such as external actuators and mechanical linkages, and is accordingly less costly. The design disclosed by this invention, moreover, allows the plunger and piston assembly to be readily cleaned and repaired.

The figure shows the shape of the valve body, and a cross section that discloses the relationship and details of all principal parts and components.

In accordance with the figure, the invention consists of an integral supporting structure 1 shaped internally so as to include a duct 2 which serves as the flow path for the valve fluid. The term valve fluid will refer to any fluid passing through duct 2. The integral supporting structure as well as any of its related parts may be made of ferrous or nonferrous metals or alloys, plastics or other organic or nonorganic substance. Although this duct or flow path is generally of circular cross section, it may be elliptical in cross section as well, or of some other similar shape. At the terminal locations of the duct 3, means are provided to mechanically couple tubing or pipe to these locations so as to conduct fluid into and out of the valve. Such a coupling may, for example, be accomplished through a screw thread. The coupling function may also be accomplished through such means as sweating, brazing, welding, bolting (flanges) and other similar techniques.

The supporting structure 1 contains also a duct within which a plunger 4 slides to open and close the valve thereby controlling the flow of the valve fluid. When the plunger is in the position of that shown in the figure, the flow of the valve fluid through the duct is inhibited and the valve is closed.

To permit fluid to pass through the valve duct 2, the plunger 4 may be completely retracted so as not to extend into the path of the fluid and thus reduces losses of velocity and pressure within the valve fluid.

The plunger 4 is actuated by means of a fluid chamber 5 which is an integral part of the valve. To retract the plunger and thereby open the valve, the actuating fluid is admitted through the opening 6. This opening connects the exterior of the valve to the actuating fluid chamber through the duct 7. Opening 6 has provision by means of which a hose, pipe or tubing may be coupled to it, in order to connect the actuating fluid chamber to its source (not shown). Such a coupling may be conveniently accomplished through the application of a screw thread, but other coupling methods as enumerated for the openings 3 may also be employed.

When the fluid stream through duct 7 impinges upon disc 9, a force is generated along the longitudinal axis of the plunger, and this force serves to retract the plunger. Through proper control of the actuating fluid flow from its source, and with the use of a spring in chamber 5 if necessary, it is possible to retract the plunger only partially and thus reduce at will the amount of fluid flow through the valve.

When the plunger is fully retracted so as not to interfere with the normal flow pattern of the fluid in the valve, disc 9 is in contact with the head structure 10 of the actuating chamber. The head structure is made an integral part of the valve by being connected to walls 11 which form the sides of the actuating chamber. These walls connect structure 10 with that of 1 and accordingly form an enclosure for the actuating fluid. These walls 10 are pressure resisting and may be made of any of the materials cited for the construction of the supporting structure 1. It is not necessary that the material used for walls 11 and head 10 be identical to the composition of structure 1. The connection of head 10 and wall 11 to structure 1 may be accomplished by bolting, clamping, threading, etc.

Assuming the plunger has been retracted so that disc 9 is in contact with head 10, the plunger can be returned to the position shown in the figure by admitting a fluid stream through opening 12 in the head structure. When the fluid stream is applied to the top surface of disc 9, an axial force is generated that causes the plunger to slide into the position which closes the valve. In a manner similar to that described for opening 6, opening 12 is coupled to the actuating fluid source by means of a hose, piping or tubing. This coupling function may be accomplished conveniently through a screw thread or through any of the other methods cited for the case of opening 6. Alternatively, a spring (not shown) may be placed on either side of disc 9 if it is desired to have the fluid actuate the valve in only one direction and to have the spring actuate the valve in the other direction.

For the actuating fluid chamber to be efficient in the operation of the plunger, it is essential that a pressure tight seal exists between the head 10 and walls 11. This sealing action is accomplished by inserting an O-ring 13 at the interface of these two parts of the valve. This O-ring may be made of a resilient material such as neoprene or some similar material. A similar O-ring 14 is inserted at the interface of wall 11 and structure 1, to form a pressure tight seal between these two sections. O rings are used in these examples but other types of seals may also be used.

The force generated as a result of the pressure of a fluid such as air upon disc 9, is transmitted to the plunger by securing the disc to the plunger through means of a C-clamp 15. This C-clamp grips the plunger through the groove 16 which is formed in the plunger shank. Accordingly, C-clamp 15 supports the side of the disc facing the head, and prevents it from sliding off the plunger. Disc 9 may be formed from 2 plates 9a and 9b which are separated by two O-rings 17 and 18 which are located in grooves 27 and 28, respectively and which O-rings contact piston 4 and wall 11, respectively. The O-rings are urged against the piston and wall by spacing member 9c. Alternatively, the disc 9 may be formed of a single plate having outer peripheral groove 28 and inner peripheral groove 27. The grooves 9a and 9b side the disc 9 contain O-rings 17 and 18, respectively. C-clamp 19 is situated in a groove 20 similar to that of groove 16. Thus disc 9 is held by C-clamps 15 and 19. O-rings 17 and 18 form an airtight seal between the plunger and disc 9, and between walls 11 and disc 9, respectively. Such a seal is required in order to develop the full effect of the actuating fluid pressure upon the disc for the purpose of moving the plunger. The assembly of disc 9, O-rings 17 and 18, and C-clamps 15 and 19, thus comprise a piston which is constructed integrally with the plunger. Various types of clamping arrangements may be used, and the plunger and disc may also be one piece.

The actuating fluid in chamber 5 is isolated or sealed off from duct 2 occupied by the valve fluid through the presence of O-rings 21, 22 and 23. Ring 23 is not necessary except for the advantage of dual seals on the valve chamber side of duct 2. Such isolation of the chamber 5 from the duct 2 is required to prevent intermixing of the actuating fluid used to operate the plunger, with the fluid through the valve. The O-rings 21, 22 and 23 are held by grooves located within the supporting structure. The inside wall of the supporting structure 1 is cut back or tapered on the valve chamber side of duct 2 to form a shoulder 29. The groove for the O-ring 23, or O-ring 22 if O-ring 23 is not present, should be greater than one-half the O-ring cross section. The tapering begins at the edge of the O-ring groove adjacent the piston 4. This configuration provides a shoulder large enough to retain the O-ring but prevents foreign matter from being trapped between the piston and the wall of the supporting structure adjacent the O-ring.

Aside from its sealing function, O-ring 23 also serves to clean the plunger shank from foreign particles that may have collected on its surface through usage of the valve. This cleansing function results from the wiping action generated when the plunger slides towards its retracted position for the purpose of opening the valve.

After extended usage and aging of the parts of the valve, it is possible that some amount of leakage may occur through the O-rings. Under these circumstances, portions of the fluid in the valve are lost or the fluid enters the actuating chamber in the usual type of integral valve. This invention, however, avoids this problem resulting from such leakage, by providing a bleed hole 24 between O-rings 21 and 22. Accordingly if the sealing action of O-ring 21 should not be complete, any fluid that succeeded to seep past this O-ring from chamber 5, will be conducted through the bleed hole and out to the exterior of the valve. In this manner, any actuating fluid that has seeped past the O-ring will not flow into the fluid in the valve. If, on the other hand, O-rings 22 and 23 were not completely effective in their sealing function, any seepage of fluid from the valve past these O-rings would also be conducted away by bleed hole 24. In this situation the bleed hole serves to prevent the valve fluid from flowing into the fluid actuating chamber thereby causing possible problems with the actuating fluid source. Bleed hole 24 is not only important for carrying away fluid losses, but also to relieve pressures that may get past the faulty seals.

Bleed hole 24 at the surface of the valve, may include a screw thread by means of which a tube, pipe or other conducting means may be connected to the bleed hole to convey the fluid through it, to an external source of collection. By employing two O-rings 22 and 23 adjacent to each other in the manner shown in the figure, the possibility of leakage from the valve chamber is reduced.

O-rings 24 and 25 are provided to assure that no fluid flows through the valve when the plunger is located in the position which designates that the valve be closed. Two such O-rings may be used to insure sealing in the event one seal fails thus offering longer periods between repairs. While certain parts have been specifically described for clarity it will be understood that other types of material and equivalent structures may be used, for example the term O-rings used for the sealing means is not a term of limitation for it includes quad-rings, square rings, U-cups and similar sealing means. Therefore, the specification is merely exemplary of the invention whose scope with the foregoing explanation is defined in the appended claims.

I claim:

1. A valve of integral construction comprising:
   a supporting structure to serve as the body of the valve and provide bearing surface for the internal parts of the valve;
   a duct within the body of the valve to allow the passage of fluid through the valve, the duct leading to the exterior of the valve so as to provide entrance and exit locations of the valve;
   a plunger to control the passage of fluid through the duct, said plunger terminating the flow of fluid through the valve when located within the duct;
   a piston integrally assembled with the plunger, said piston comprising a plurality of discs having sealing means between the discs pressing against the interior walls of the actuating fluid chamber and the plunger, the sealing means comprising a plurality of O-rings, the discs being held in place by two clamps confined in grooves located in the plunger to form an integral assembly between piston and plunger;
   a fluid actuating chamber confining the piston and integrally constructed with the valve body, the fluid actuating chamber containing means to allow actuating fluid to enter and leave the chamber for purposes of acting against the piston and positioning the plunger within the valve fluid duct;
   means to seal the fluid actuating chamber from the valve fluid duct to prevent continued mixing of either medium by the other, the valve fluid duct adjacent the sealing means being tapered;
   a bleed duct to convey to the exterior of the valve leakage actuating fluid or leakage valve fluid so as to prevent continued intermixing of either to the other in the event of malfunctioning of the sealing means; and
   means to seal the valve fluid duct when the plunger is located within the duct.

2. The valve of claim 1 wherein the means to seal the actuating fluid chamber from the valve fluid duct comprises three O-rings held by grooves in the supporting valve body structure, the O-ring being situated so as to provide wiping and cleansing action upon the surface of the plunger.

3. The valve of claim 2 wherein the bleed duct is related to the three O-rings such that the bleed duct is located between the O-ring adjacent to the actuating fluid chamber and the two rings adjacent to the valve fluid duct.

4. The valve of claim 1 wherein the terminal areas of the valve fluid duct are screw threaded to permit coupling of conducting means to entrance and exit of the valve.

5. The valve of claim 1 wherein the means to allow actuating fluid to enter and leave the chamber comprises screw threaded openings located on opposite sides of the piston and being integrally constructed with the confining structure of the chamber.

6. The valve of claim 2 wherein the means to seal the valve fluid duct when the plunger is located within the duct, comprises two O-rings held by grooves located at the plunger surface.

7. The valve of claim 3 wherein the section of the bleed duct at the exterior surface of the valve is screw threaded to permit coupling to pipe or conducting means so as to convey the bled material to a remote location.

8. The valve of claim 2 wherein the groove adjacent the fluid duct has a depth greater than one-half the cross section of the O-ring.

9. The valve of claim 8 wherein the wall of the groove adjacent the fluid duct is tapered.